UNITED STATES PATENT OFFICE.

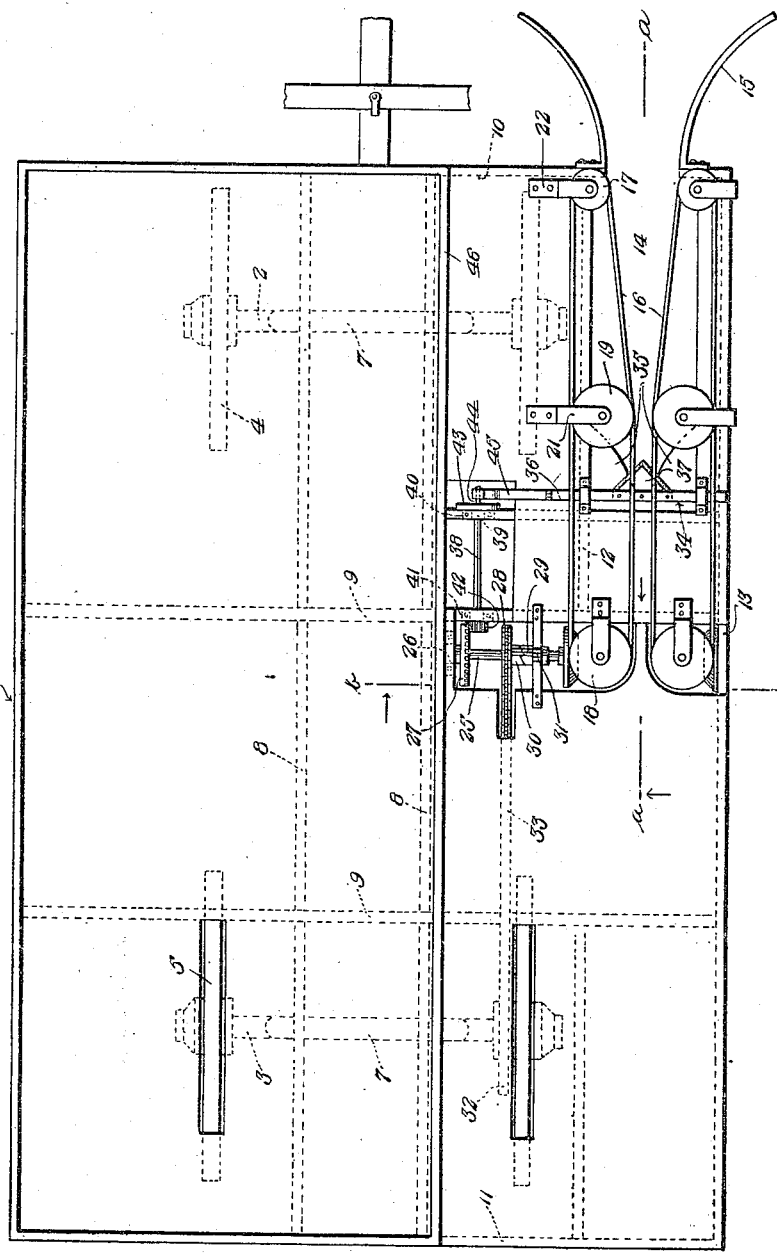

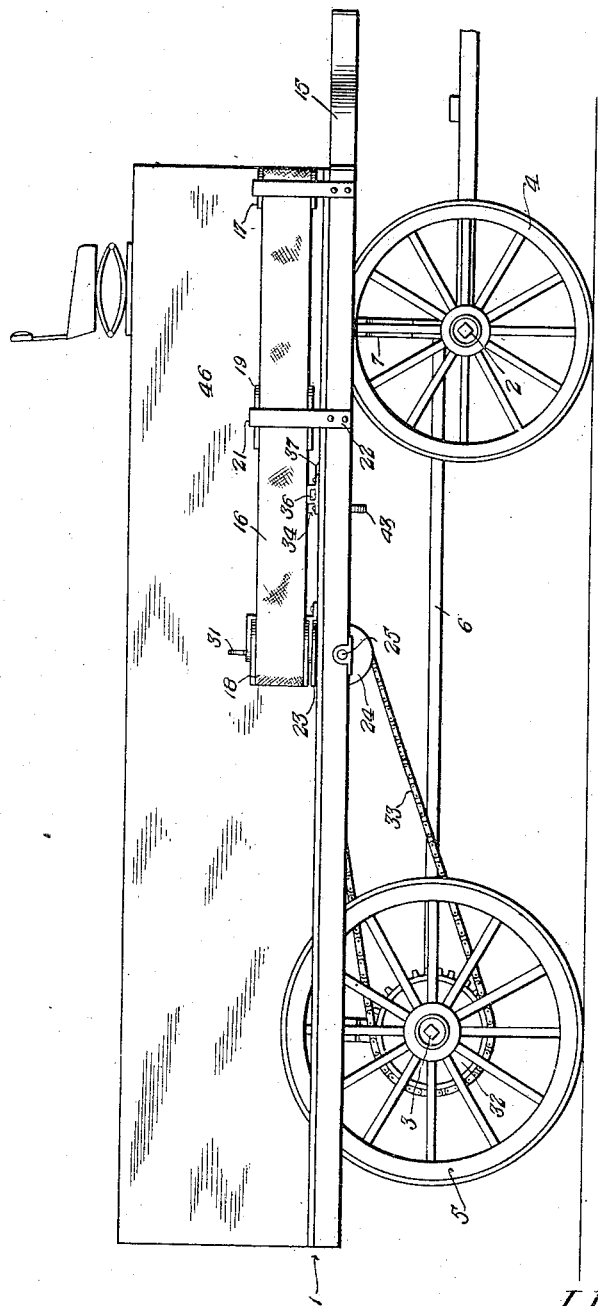

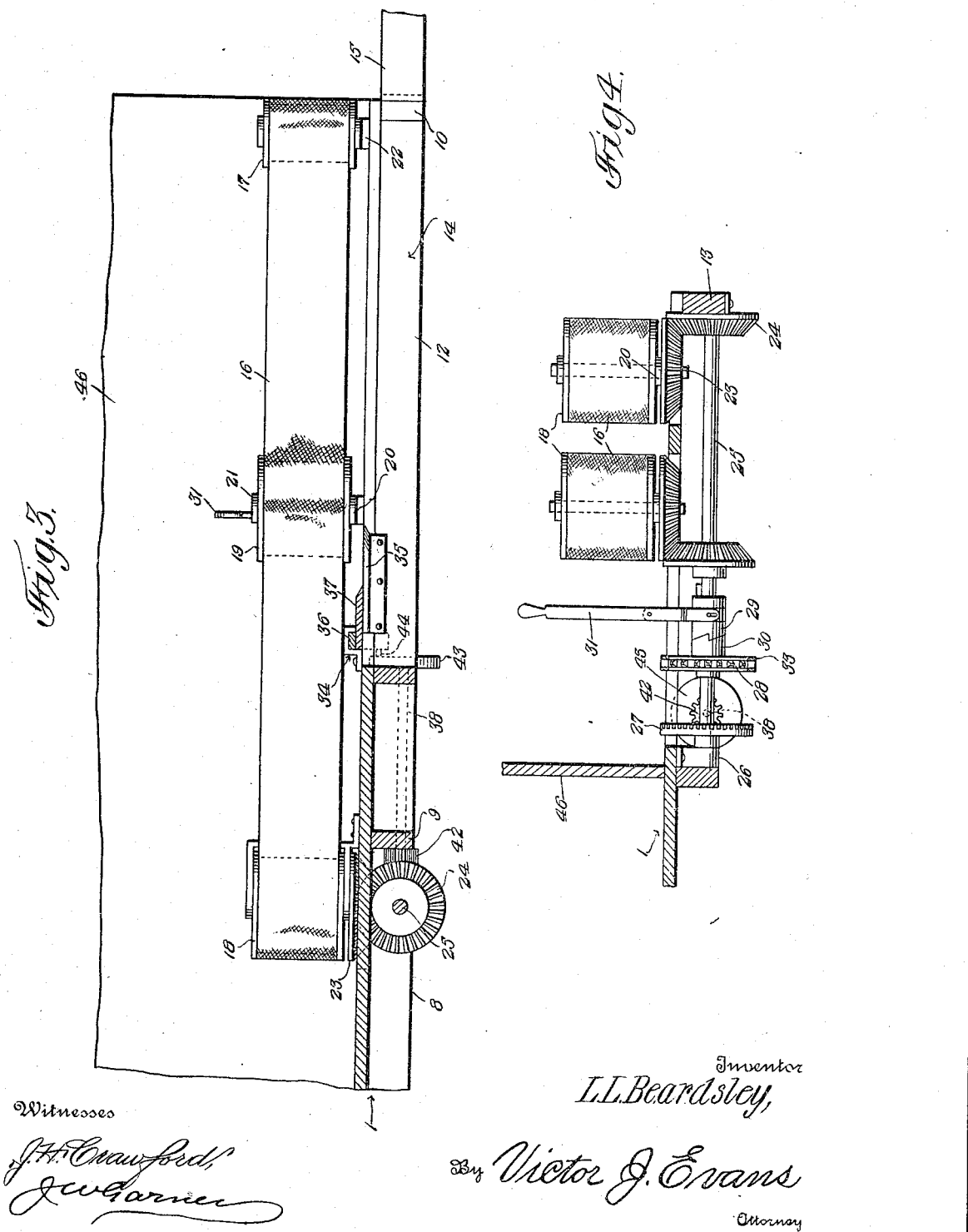

LEROY L. BEARDSLEY, OF FORGAN, OKLAHOMA.

KAFIR-CORN HEADER.

1,203,961.   Specification of Letters Patent.   Patented Nov. 7, 1916.

Application filed June 29, 1915.  Serial No. 36,988.

*To all whom it may concern:*

Be it known that I, LEROY L. BEARDSLEY, a citizen of the United States, residing at Forgan, in the county of Beaver and State of Oklahoma, have invented new and useful Improvements in Kafir-Corn Headers, of which the following is a specification.

This invention is an improved machine for use on and in connection with an ordinary farm wagon for heading Kafir corn, milo maize, Jerusalem corn, feterita, sorghum or cane and other like grain while standing in rows in the field, the object of the invention being to provide an improved machine of this character which is light, cheap and simple, which can be readily drawn and operated by a pair of horses, which requires the employment of only two attendants, one to drive and the other to properly stow or place the headed grain on the rack, and which also is adapted to operate rapidly so as to make the harvesting of grain of this kind in large quantities practicable, and by means within reach of the ordinary farmer and without waste of the grain.

The invention consists in the construction, combination and arrangement of devices hereinafter described and claimed.

In the accompanying drawings:—Figure 1 is a plan of a Kafir corn header constructed in accordance with my invention. Fig. 2 is a side elevation of the same. Fig. 3 is a detail vertical longitudinal sectional view on the plane indicated by the line *a—a* of Fig. 1. Fig. 4 is a detail transverse vertical sectional view on the plane indicated by the line *b—b* of Fig. 1.

In the embodiment of my invention I provide a rack or barge 1 which is adapted to be placed on the running gear of an ordinary farm wagon of which the front and rear axles are indicated at 2, 3 respectively, the front wheels at 4, the rear wheels at 5, the reach at 6 and the bolsters at 7. In Fig. 1 the rack is shown as developed its bottom boards so that the running gear of the wagon is disclosed.

The rack comprises a pair of longitudinal bars 8 which are secured on the bolsters and against the inner sides of the standards. Intermediate cross bars 9 are also secured on the bars 8 at points between the front and rear wagon wheels. The rack also has a front cross bar 10 and a rear cross bar 11. The width of the rack exceeds that of the wagon so that the sides of the rack extend beyond and outwardly from the sides of the wagon. On the right hand side of the rack a pair of longitudinally arranged bars 12, 13, form a runway 14. Between the front portions of said bars 12, 13 and on opposite sides of said runway at the front end thereof are forwardly diverging gathering arms 15 which when the machine is in use and driven parallel with a row of standing grain engage opposite sides of the standing grain and direct the same into the runway.

On opposite sides of the runway are vertically arranged endless gathering belts 16. Each of these belts engages a front roller 17, a rear roller 18 and an intermediate idler roller 19. The rollers are vertically arranged and mounted at their lower ends in suitable bearings 20, the upper ends of the rollers being mounted in bearings 21 in suitable brace frames 22 which are secured above the bars 12, 13.

At the lower end of each rear roller 18 is a miter gear 23. The gears 23 are engaged by similar gears 24 on a transversely arranged shaft 25 which is mounted in suitable bearings 26 with which the frame of the rack is provided. This shaft has a crown wheel 27 near its inner end. It is also provided with a loose sprocket wheel 28 and a splined clutch member 29 which may be engaged with or disengaged from a clutch hub 30 with which said sprocket wheel 28 is provided. A suitable shipper lever 31 is provided for shifting the said sprocket wheel into and out of engagement with the the clutch so that the sprocket wheel may be locked to the shaft and permitted to rotate idly thereon as required. The right hand rear wheel 5 has a sprocket wheel 32 thereon which is connected by an endless sprocket chain 33 with the sprocket wheel 28. Hence the sprocket wheel 28 is constantly driven when the machine is in motion and causes the shaft 25 to revolve when said sprocket wheel 28 is clutched to said shaft. The gears 23, 24 cause the rollers 18 to operate the gathering belts so that the inner leads of the gathering belts move rearwardly as indicated by the arrow in Fig. 1. At a suitable distance in rear of the idler rollers 18 is a cutting apparatus 34 which is here shown as consisting of a pair of fixed guard knives 35 which converge rearwardly and are arranged at opposite sides of the runway and a reciprocating cutter bar 36 which carries a triangular cutter blade 37 which moves across the guard knives.

A longitudinal shaft 38 has a bearing 39 in a bracket 40 with which the rack frame is provided and also has a bearing 41 secured to the rack frame. This shaft has a pinion 42 at its rear end which engages the crown gear 27. At the front end of said shaft is a crank disk 43 which has a crank pin 44. A pitman 45 connects said crank pin with the cutter bar. It will be understood that the cutter bar is reciprocated when the machine is in motion.

A suitable fender 46 is also provided which is arranged a slight distance from the inner side of the inner gathering belt and serves to prevent the load on the rack from pressing against and interfering with the operation of said gathering belt.

The machine is adapted to be drawn by a pair of horses hitched thereto as to a wagon and requires the services of but two persons, one to drive the team and the other to stand in rear of the gathering belts with a fork or other like implement and to stow the grain heads dropped from the gathering belts on the rack so as to properly load the rack while the machine is being driven along the rows. When the rack is fully loaded the machine is then driven to a suitable place and unloaded.

While I have herein shown a preferred embodiment of my invention I would have it understood that changes may be made in the form, proportion and arrangement of the prospective parts within the scope of my invention as defined by the appended claim.

Having thus described my invention I claim:

A grain header adapted to be applied to the running gear of a wagon comprising a rack body having a platform located beyond one of its sides and at the same level as the bottom of the body, said platform being provided at its end with a runway, a cutting apparatus mounted upon the platform at the runway, stalk gathering and conveying means mounted on the platform and extending behind the cutting apparatus, and means for operating the cutting apparatus and the stalk gathering and conveying means and including a clutch mechanism having a lever disposed above the platform and the edges thereof, there being sufficient area at the rear portion of the platform to permit an operator to stand and transfer the material which is delivered by the stalk conveying means upon the platform from the platform to the rack body, and the adjacent side wall of the rack body serving as a fender to prevent the material deposited in the body from contacting with the stalk gathering and conveying means and the cutting apparatus.

In testimony whereof I affix my signature in presence of two witnesses.

LEROY L. BEARDSLEY.

Witnesses:
    W. Z. ALLEN,
    FANNIE ALLEN.

Copies of this patent may be obtained for five cents each, by addressing the "Commissioner of Patents, Washington, D. C."